United States Patent [19]

Watanabe et al.

[11] Patent Number: 4,511,493
[45] Date of Patent: Apr. 16, 1985

[54] TERNARY INTERCALATION COMPOUND OF A GRAPHITE WITH A METAL FLUORIDE AND FLUORINE, A PROCESS FOR PRODUCING THE SAME, AND AN ELECTRICALLY CONDUCTIVE MATERIAL COMPRISING THE TERNARY INTERCALATION COMPOUND

[75] Inventors: Nobuatsu Watanabe, 136 Uguisudai, Nagaokakyo-shi, Kyoto; Tsuyoshi Nakajima, Kyoto; Masayuki Kawaguchi, Arida, all of Japan

[73] Assignee: Nobuatsu Watanabe, Kyoto, Japan

[21] Appl. No.: 530,239

[22] Filed: Sep. 8, 1983

[30] Foreign Application Priority Data

Mar. 9, 1983 [JP] Japan .................. 58-37263

[51] Int. Cl.³ .......................... B01J 27/12; H01B 1/04
[52] U.S. Cl. ................................ 252/507; 252/506; 252/509; 423/448; 502/181
[58] Field of Search .............. 423/448; 502/181; 252/507, 509, 506

[56] References Cited

U.S. PATENT DOCUMENTS 3,925,495 12/1975 Rodewald ............. 502/181 X
3,956,194 5/1976 Armand ................ 252/507
3,962,133 6/1976 Rodewald ............. 502/181
3,984,352 10/1976 Rodewald ............. 502/181
4,119,655 10/1978 Hulme ................ 252/507 X

FOREIGN PATENT DOCUMENTS 2543788 5/1976 Fed. Rep. of Germany ...... 502/181

OTHER PUBLICATIONS

H. Selig and L. B. Ebert, Adv. Inorg. Chem. Radiochem. 23, 281, (1980).

Primary Examiner—G. L. Kaplan
Attorney, Agent, or Firm—Armstrong, Nikaido, Marmelstein & Kubovcik

[57] ABSTRACT

A novel ternary intercalation compound of a graphite with a metal fluoride and fluorine, which is represented by the formula $C_xF(MF_z)_y$ wherein M is a metal is produced by reacting a graphite material with a metal fluoride in an atmosphere of fluorine gas at a temperature of 0° C. to 400° C. for at least a period of time to effect a weight increase in the graphite. The ternary graphite intercalation compound thus obtained has not only an excellent stability to humidity or moisture but also a high electrical conductivity. The novel ternary graphite intercalation compound according to the present invention may be practically used as a novel electrically conductive material and a catalyst of organic reactions.

7 Claims, 8 Drawing Figures

FIG. 4
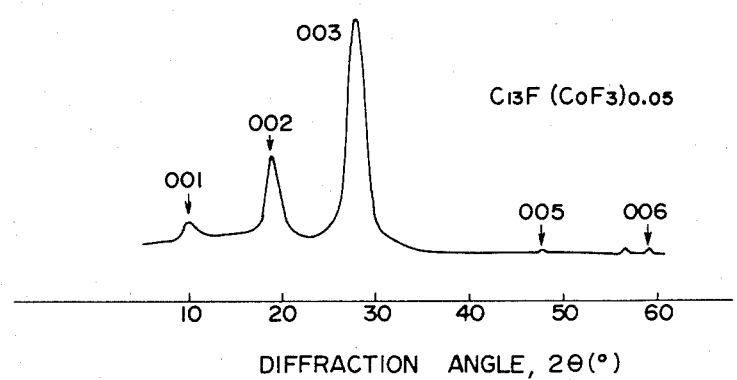
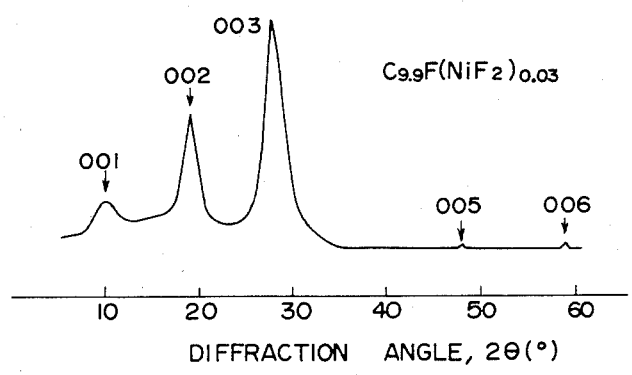

DIFFRACTION ANGLE, 2θ (°)

TERNARY INTERCALATION COMPOUND OF A GRAPHITE WITH A METAL FLUORIDE AND FLUORINE, A PROCESS FOR PRODUCING THE SAME, AND AN ELECTRICALLY CONDUCTIVE MATERIAL COMPRISING THE TERNARY INTERCALATION COMPOUND

This invention relates to a novel graphite intercalation compound. More particularly, the present invention is concerned with a ternary intercalation compound of a graphite with a metal fluoride and fluorine which is not only stable to humidity or moisture but also exhibits an excellent electrical conductivity. The present invention is also concerned with a process for producing a ternary intercalation compound of a graphite with a metal fluoride and fluorine. The present invention is further concerned with an electrically conductive material comprising the ternary intercalation compound of a graphite with a metal fluoride and fluorine.

In recent years, attention has increasingly been given to graphite intercalation compounds of fluorides because of their excellent electrical conductivities. However, most of conventionally known graphite intercalation compounds of fluorides are poor in stability to humidity or moisture so that they decompose immediately upon exposure to air and, hence, cannot be put to a practical use.

We have made extensive and intensive investigations with a view to developing a practically useful graphite intercalation compound of a fluoride having not only an excellent electrical conductivity but also an excellent stability to humidity or moisture. As a result, it has been found that a ternary intercalation compound of a graphite with a metal fluoride and fluorine, which is represented by the formula $C_xF(MF_z)_y$ (wherein M is a metal selected from the group consisting of Pb, transition elements, alkaline earth metals exclusive of Mg and metals in group IIIA of the periodic table exclusive of Al) (hereinafter often referred to simply as "ternary graphite intercalation compound"), can be obtained in a yield of 100% relative to the graphite material employed. The ternary graphite intercalation compound thus obtained is excellent not only in stability to humidity or moisture but also in electrical conductivity. The electrical conductivity of the present ternary graphite intercalation compound is very high as compared with that of the raw graphite material employed. The present invention has been made based on such novel findings.

Accordingly, it is an object of the present invention to provide a novel ternary graphite intercalation compound which is excellent not only in stability to humidity or moisture but also in electrical conductivity.

It is another object of the present invention to provide a process for the production of such a novel ternary graphite intercalation compound.

It is still another object of the present invention to provide a novel electrically conductive material comprising a novel ternary graphite intercalation compound of the kind described above.

The foregoing and other objects, features and advantages of the present invention will be apparent to those skilled in the art from the following detailed description taken in connection with the accompanying drawings in which:

FIG. 4 shows X-ray diffraction patterns of $C_{13}F(CoF_3)_{0.05}$ and $C_{9.9}F(NiF_2)_{0.03}$ which are further forms of the ternary graphite intercalation compounds according to the present invention;

Figure 1:
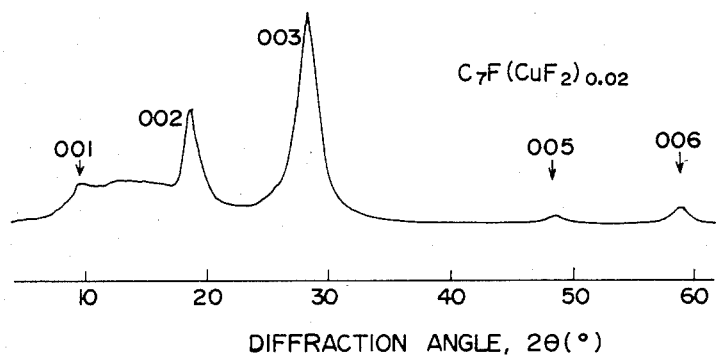
FIG. 1 shows an X-ray diffraction pattern of $C_7F(CuF_2)_{0.02}$ which is one form of the ternary graphite intercalation compounds according to the present invention.

According to one aspect of the present invention, there is provided a ternary intercalation compound of a graphite with a metal fluoride and fluorine represented by the formula $$C_xF(MF_z)_y$$

(wherein M is a metal selected from the group consisting of Pb, transition elements, alkaline earth metals exclusive of Mg and metals in group IIIA of the periodic table exclusive of Al; x is about 1 to about 100; y is about 0.0001 to about 0.15; and z is valence of M).

In general, the ternary graphite intercalation compound represented by the formula $C_xF(MF_z)_y$ wherein M, x, y and z are as defined above can be produced by reacting a graphite material with a metal fluoride selected from the group consisting of fluorides of Pb, transition elements, alkaline earth metals exclusive of Mg and metals in group IIIA of the periodic table exclusive of Al in an atmosphere of fluorine gas at a temperature of 0° C. to 400° C. for at least a period of time to effect a weight increase in the graphite.

The present invention will now be described in detail.

In the present invention, the metal represented by M is Sc, Ti, V, Cr, Mn, Fe, Co, Ni, Cu, Zn, Y, Zr, Nb, Mo, Tc, Ru, Rh, Pd, Ag, Cd, La, lanthanides, Hf, Ta, W, Re, Os, Ir, Pt, Au, Hg, Ac, actinides, Be, Ca, Sr, Ba, Ra, Ga, In, Tl or Pb, preferably, one of which the fluoride has a boiling point of about 400° C. or more or one of which the fluoride has a sublimation point of about 400° C. or more. Specific examples of the metal which is represented by M and of which the fluoride has a boiling point of about 400° C. or more or has a sublimation point of about 400° C. or more include Sc, Cr, Mn, Fe, Co, Ni, Cu, Zn, Ga, In, Tl, Pb, Y, Zr, Ag, Cd, Hf, Hg, La, Ce, Pr, Nd, Sm, Eu, Gd, Tb, Dy, Ho, Er, Tm, Yb, Lu, Th, Be, Ca, Sr, Ba and Ra. Generally, in the ternary graphite intercalation compound of the formula $C_xF(MF_z)_y$, x is about 1 to about 100 and y is about 0.0001 to about 0.15. The ternary graphite intercalation compounds of the formula $C_xF(MF_z)_y$ according to the present invention include 1st stage, 2nd stage, 3rd stage, 4th stage, 5th stage, 6th stage, 7th stage and sometimes 8th or higher stage compounds and mixed stage compounds thereof. The stage number of the ternary graphite intercalation compound can be determined by the measurement of the identity period (Ic) obtained by X-ray diffraction. The stage number of the formed ternary graphite intercalation compound depends not only on the reaction temperature and time, but also on the crystallinity and thickness (c-axis direction) of a graphite material. The values of x and y vary according to the stage number of the ternary graphite intercalation compounds. For the 1st stage compound, the value of x ranges from about 1 to about 20 and the value of y ranges from about 0.002 to about 0.15. For the 2nd stage compound, the value of x ranges from about 5 to about 40 and the value of y ranges from about 0.001 to about 0.10. For the 3rd or higher stage compound, the value of x ranges from about 20 to about 100 and the value of y ranges from about 0.0001 to about 0.01. With respect to each of the 1st stage, 2nd stage and 3rd stage or higher stage compounds, the values of x and y vary, within the above-mentioned range of each case, not only depending on the reaction temperature and time, but also depending on the crystallinity and c-axial thickness of a graphite material.

The graphite material to be used for the production of a ternary graphite intercalation compound according to the present invention may be any of a natural graphite and an artificial graphite which can be obtained by subjecting petroleum coke or the like to heat treatment. The size of the graphite material is not critical. There may be employed a flaky (generally, about 10 to about 80 mesh, Tyler) or powdery graphite (generally, not less than about 80 to about 400 mesh, Tyler). Meanwhile, in case a block-shaped graphite is desired, there may be used a material which can be obtained by a process which comprises contacting a hydrocarbon such as methane, propane, benzene and/or acetylene with a substrate (generally, made of an artificial graphite) heated at approximately 2,100° C. to pyrolyze the hydrocarbon and to deposit the resulting graphite material on the substrate, and subjecting the deposited graphite material to heat treatment. Block-shaped graphites having different graphitization degrees are obtained according to the heat-treatment temperature. When the heat treatment is effected at about 2,400° C., there is obtained a pyrolytic carbon. When the heat treatment is effected at about 2,600° C. to 3,000° C., there is obtained a pyrolytic graphite having a high crystallinity as compared with that of a pyrolytic carbon.

A ternary graphite intercalation compound of the formula $C_xF(MF_z)_y$ (wherein M is a metal selected from the group consisting of Pb, transition elements, alkaline earth metals exclusive of Mg and metals in group IIIA of the periodic table exclusive of Al; x is about 1 to about 100; y is about 0.0001 to about 0.15; and z is valence of M) can be obtained by reacting a graphite material with a metal fluoride selected from the group consisting of fluorides of Pb, transition elements, alkaline earth metals exclusive of Mg and metals in group IIIA of the periodic table exclusive of Al in an atmosphere of fluorine gas at a temperature of 0° C. to 400° C. for at least a period of time to effect a weight increase in the graphite. The above-mentioned reaction may be performed in various ways, which are not limited to the following ways. For example, there may be employed a process in which a graphite material is contacted with a metal fluoride in an atmosphere of fluorine gas. In this case, the metal fluoride remaining unreacted is separated by means of a sieve or a pincette to obtain the desired ternary graphite intercalation compound. As another example of the ways to carry out the above-mentioned reaction there may be employed a process similar to the process which is known as "dual furnace process" [J. Phys, D 1, 291 (1968)]. In this process similar to the dual furnace process, a graphite material and a metal fluoride are placed apart from each other in a reactor and the graphite material is caused to react with the metal fluoride in an atmosphere of fluorine gas to obtain a desired ternary graphite intercalation compound. This process is advantageous in that troublesome procedures to separate the resulting ternary graphite intercalation compounds from the metal fluoride remaining unreacted are not required.

Following are the desirable reaction conditions in producing a ternary graphite intercalation compound of the formula $C_xF(MF_z)_y$ (wherein M is a metal selected from the group consisting of Pb, transition elements, alkaline earth metals exclusive of Mg and metals in group IIIA of the periodic table exclusive of Al; x is about 1 to about 100; y is about 0.0001 to about 0.15; and z is valence of M) by reacting a graphite material with a metal fluoride in an atmosphere of fluorine gas at a temperature of 0° C. to 400° C. for at least a period of time to effect a weight increase in the, graphite. The fluorine gas pressure is not critical, but may usually be 0.1 to 10 atm. The reaction temperature is 0° to 400° C., preferably 0° to 300° C. The reaction time to obtain the composition of the formula $C_xF(MF_z)_y$ having desired values of x and y depends on the crystallinity and c-axial thickness of a graphite material and the reaction temperature. But, the reaction time generally is 30 minutes to 10 days and more usually 1 hour to 7 days. The weight amount ratio of a graphite material to a metal fluoride depends on the desired stage number of the ternary graphite intercalation compound, but generally 1:0.01 to 1:100. When the c-axial thickness of a graphite material is more than 1 mm, the product tends to be of the 2nd stage or higher stage rather than of the 1st stage. In order to obtain the 1st stage compound, it is generally preferred to employ a graphite material having a thickness (c-axis direction) of up to 0.8 mm.

After completion of the reaction, if the temperature of the reaction system has been elevated to a temperature higher than room temperature, the reaction system is cooled to room temperature to obtain the desired ternary graphite intercalation compound of the formula $C_xF(MF_z)_y$.

In the case where M is Cu in the formula $C_xF(MF_z)_y$, the identity periods (Ic) of $C_xF(MF_z)_y$ are about 9.3 to 9.4 Å, about 12.7 to 12.8 Å, about 16.0 to 16.1 Å, about 19.4 to 19.5 Å, about 22.7 to 22.8 Å, about 26.1 to 26.2 Å, about 29.4 to 29.5 Å and about 32.8 to 32.9 Å for the 1st, 2nd, 3rd, 4th, 5th, 6th, 7th and 8th stage compounds, respectively. In the case where M is Ni or Co in the formula $C_xF(MF_z)_y$, the identity periods (Ic) of $C_xF(MF_z)_y$ are about 9.4 to 9.7 Å, about 12.8 to 13.1 Å, about 16.1 to 16.4 Å, about 19.5 to 19.8 Å, about 22.9 to 23.2 Å, about 26.3 to 26.6 Å, about 29.6 to 29.9 Å and about 33.0 to 33.3 Å for the 1st, 2nd, 3rd, 4th, 5th, 6th, 7th, and 8th stage compounds, respectively. In the case where M is Fe or Pb in the formula $C_xF(MF_z)_y$, the identity periods (Ic) of $C_xF(MF_z)_y$ are about 9.3 to 9.7 Å, about 12.7 to 13.1 Å, about 16.0 to 16.4 Å, about 19.4 to 19.8 Å, about 22.8 to 23.2 Å, about 26.2 to 26.6 Å, about 29.5 to 29.9 Å and 32.9 to 33.3 Å for the 1st, 2nd, 3rd, 4th, 5th, 6th, 7th and 8th stage compounds, respectively. In the case where M is Zr in the formula $C_xF(MF_z)_y$, the identity periods (Ic) of $C_xF(MF_z)_y$ are about 9.4 to 9.8 Å, about 12.8 to 13.2 Å, about 16.1 to 16.5 Å, about 19.5 to 19.9 Å, about 22.9 to 23.3 Å, about 26.3 to 26.7 Å, about 29.6 to 30.0 Å and about 33.0 to 33.4 Å for the 1st, 2nd, 3rd, 4th, 5th, 6th, 7th, and 8th stage compounds, respectively. In the case where M is Ce in the formula $C_xF(MF_z)_y$, the identity periods (Ic) of $C_xF(MF_z)_y$ are about 9.5 to 9.9 Å, about 12.9 to 13.3 Å, about 16.2 to 16.6 Å, about 19.6 to 20.0 Å, about 23.0 to 23.4 Å, about 26.4 to 26.8 Å, about 29.7 to 30.1 Å and about 33.1 to 33.5 Å for the 1st, 2nd, 3rd, 4th, 5th, 6th, 7th, and 8th stage compounds, respectively. Generally, the identity periods (Ic) of $C_xF(MF_z)_y$ for each of the 1st stage, 2nd stage, 3rd stage, 4th stage, 5th stage, 6th stage, 7th stage and 8th stage compounds slightly vary depending on the kind of the metal M in the formula $C_xF(MF_z)_y$.

The ternary graphite intercalation compounds of the present invention are stable to humidity or moisture. For example, in the case of $C_xF(CuF_2)_y$, even after exposure to air for several weeks or immersion in water overnight, any changes are hardly observed in the X-ray diffraction patterns.

The results of elementary analysis and X-ray diffraction of some forms of the present ternary graphite intercalation compounds of the formula $C_xF(MF_z)_y$ are shown in Tables 1 to 3.

TABLE 1

| Compound | Elementary analysis (%) | X-ray diffraction data (Cu—Kα) | | | Ic(Å) |
|---|---|---|---|---|---|
| | | 2θ(°) | d(Å) | (00l) | |
| $C_{5.4}F(CuF_2)_{0.02}$ slightly bluish black (1st stage compound) | C, 75.4 F, 22.9 Cu, 1.7 | 9.5 16.15 18.89 28.52 49.6 59.13 | 9.3 5.48 4.69 3.13 1.8 1.56 | 001 unknown 002 003 005 006 | 9.38 ± 0.01 |
| $C_{8.0}F(CuF_2)_{0.04}$ slightly bluish black (1st stage compound) | C, 80.5 F, 17.3 Cu, 2.3 | 9.7 18.78 28.48 48.5 59.14 | 9.1 4.72 3.13 1.9 1.56 | 001 002 003 005 006 | 9.40 ± 0.04 |
| $C_{13}F(CuF_2)_{0.07}$ slightly bluish black (1st stage compound) | C, 85.8 F, 11.8 Cu, 2.4 | 9.5 19.20 28.45 49.0 59.15 | 9.3 4.62 3.13 1.9 1.56 | 001 002 003 005 006 | 9.32 ± 0.08 |
| $C_{7.0}F(CuF_2)_{0.02}$ slightly bluish black (1st stage compound) | C, 79.5 F, 19.0 Cu, 1.4 | 9.8 18.72 28.49 49.5 59.02 | 9.0 4.74 3.13 1.8 1.56 | 001 002 003 005 006 | 9.42 ± 0.05 |
| $C_{5.0}F(CuF_2)_{0.03}$ slightly bluish black (1st stage compound) | C, 73.0 F, 24.4 Cu, 2.6 | 9.5 18.83 28.48 48.6 59.22 | 9.3 4.71 3.13 1.9 1.56 | 001 002 003 005 006 | 9.39 ± 0.04 |
| $C_{2.4}F(CuF_2)_{0.01}$ slightly bluish black (1st stage compound) | C, 59.0 F, 40.2 Cu, 0.9 | 9.8 18.72 28.49 49.5 59.02 | 9.0 4.74 3.13 1.8 1.56 | 001 002 003 005 006 | 9.42 ± 0.05 |
| $C_{13}F(CoF_3)_{0.05}$ black (1st stage compound) | C, 85.9 F, 12.4 Co, 1.7 | 9.70 18.95 27.95 | 9.11 4.68 3.19 | 001 002 003 | 9.57 |

TABLE 1-continued

| Compound | Elementary analysis (%) | X-ray diffraction data (Cu—Kα) | | | Ic(Å) |
|---|---|---|---|---|---|
| | | 2θ(°) | d(Å) | (00l) | |
| | | 47.60 59.0 | 1.91 1.56 | 005 006 | |
| $C_{9.9}F(NiF_2)_{0.03}$ black (1st stage compound) | C, 84.5 F, 14.3 Ni, 1.2 | 9.45 18.9 28.1 48.0 59.05 | 9.35 4.69 3.17 1.89 1.56 | 001 002 003 005 006 | 9.51 |
| $C_{9.3}F(ZrF_4)_{0.05}$ black (1st stage compound) | C, 80.6 F, 16.3 Zr, 3.1 | 9.60 18.55 27.80 47.90 58.10 | 9.20 4.78 3.21 1.90 1.59 | 001 002 003 005 006 | 9.62 |
| $C_{11}F(CeF_4)_{0.01}$ black (1st stage compound) | C, 86.3 F, 12.8 Ce, 0.9 | 8.8 18.65 27.50 46.90 56.30 | 10.04 4.75 3.24 1.94 1.63 | 001 002 003 005 006 | 9.72 |

TABLE 2

| Compound | Elementary analysis (%) | X-ray diffraction data (Cu—Kα) | | (00l) | | Ic(Å) | |
|---|---|---|---|---|---|---|---|
| | | 2θ(°) | d(Å) | 1st stage | 2nd stage | 1st stage | 2nd stage |
| $C_{14}F(PbF_4)_{0.03}$ black (mixed stage compound of 1st stage and 2nd stage) | C, 86.5 F, 10.1 Pb, 3.4 | 8.7 13.4 19.7 27.6 28.35 48.8 56.7 58.8 | 10.16 6.60 4.50 3.23 3.14 1.86 1.62 1.57 | 001 002 003 005 006 | 002 004 008 | 9.42 | 12.9 |

TABLE 3

| Compound | Elementary analysis (%) | X-ray diffraction data (Cu—Kα) | | (00l) | | Ic(Å) | |
|---|---|---|---|---|---|---|---|
| | | 2θ(°) | d(Å) | 2nd stage | 3rd stage | 2nd stage | 3rd stage |
| $C_{26}F(FeF_3)_{0.02}$ black (mixed stage compound of 2nd stage and 3rd stage) | C, 93.5 F, 6.1 Fe, 0.4 | 6.12 21.92 27.83 51.53 57.99 | 14.43 4.05 3.20 1.77 1.59 | 001 003 004 007 008 | 001 004 005 009 0010 | 12.75 | 16.10 |

In the elementary analysis, the carbon contents of the ternary graphite intercalation compounds were determined using Yanagimoto High Speed CHN coder MT-2 (an apparatus manufactured and sold by Yanagimoto Seisakusho, Japan). The fluorine contents of the ternary graphite intercalation compounds were determined by the oxygen flask combustion method. With respect to the elementary analysis of the ternary graphite intercalation compounds containing Cu, the amount of fluorine attributed to copper fluoride in the ternary graphite intercalation compound cannot be sufficiently detected by the oxygen flask combustion method because of poor solubility of copper fluoride in water. Therefore, the fluorine contents of the ternary graphite intercalation compounds containing Cu are obtained by means of a correction factor which has been obtained by carrying out an experiment in which a standard copper fluoride sample is analyzed by the oxygen flask combustion method and the found value of fluorine content and the calculated value of fluorine content are compared. With respect to the elementary analysis of the ternary graphite intercalation compounds containing metal fluorides of which the solubility in water is high, such correction is not needed, but with respect to the elementary analysis of the ternary graphite intercalation compounds containing metal fluorides of which the solubility in water is low, such correction is made. Whether or not such correction is needed is actually determined by comparing the corrected value of the fluorine content with the non-corrected value of the fluorine content. The analysis of metals can be made by the atomic absorption method.

In FIG. 1, there is shown an X-ray diffraction pattern (Cu-K$_\alpha$) of $C_7F(CuF_2)_{0.02}$. In the X-ray study of this ternary graphite intercalation compound, broad diffraction lines are sometimes observed. The identity period (Ic) of the ternary graphite intercalation compound shown in FIG. 1 is calculated from the (00 l) diffraction lines to give 9.42 Å.

Figure 2:
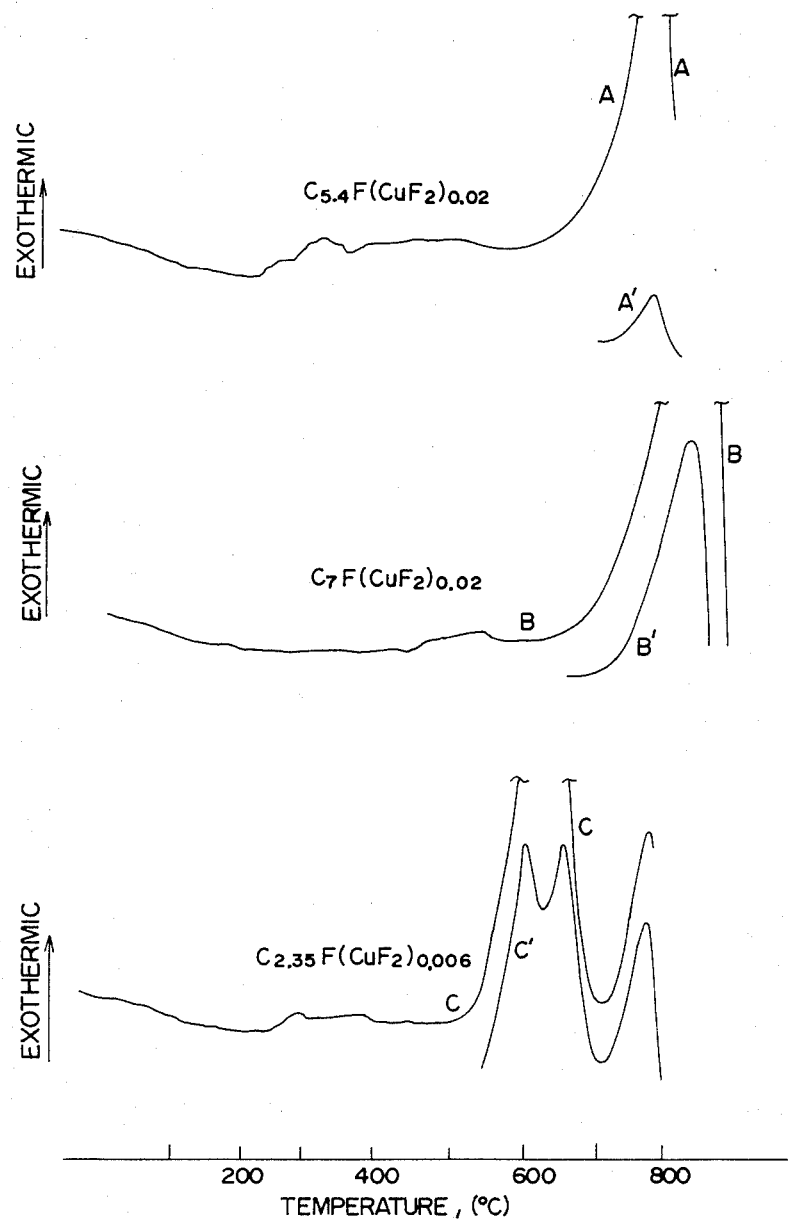
FIG. 2 shows DTA (differential thermal analysis) curves of $C_{5.4}F(CuF_2)_{0.02}$, $C_7F(CuF_2)_{0.02}$ and $C_{2.35}F(CuF_2)_{0.006}$ which are three forms of the ternary graphite intercalation compounds according to the present invention.

In FIG. 2, there are shown DTA curves (as measured in air, with a heating rate of 20° C./min) of $C_{5.4}F(CuF_2)_{0.02}$, $C_7F(CuF_2)_{0.02}$ and $C_{2.35}F(CuF_2)_{0.006}$. Curve A in FIG. 2 was obtained when about 6 mg of $C_{5.4}F(CuF_2)_{0.02}$ was used as a sample. In this case, the amount of the sample was so large that the DTA curve was over the scale of the recording paper at about 800° C. So, using a reduced amount of $C_{5.4}F(CuF_2)_{0.02}$ (about 3 mg), another DTA curve A' also shown in FIG. 2 was obtained. As is apparent from the curve A', an exothermic peak for $C_{5.4}F(CuF_2)_{0.02}$ is observed at about 800° C. Curve B in FIG. 2 was obtained when about 6 mg of $C_7F(CuF_2)_{0.02}$ was used as a sample. In this case also, the amount of the sample was so large that the DTA curve was over the scale of the recording paper at about 800° C. So, using a reduced amount of $C_7F(CuF_2)_{0.02}$ (about 3 mg), another DTA curve B' shown in FIG. 2 was obtained. As is apparent from the curve B', an exothermic peak for $C_7F(CuF_2)_{0.02}$ is observed at about 800° C. Curve C in FIG. 2 was obtained when about 6 mg of $C_{2.35}F(CuF_2)_{0.006}$ was used as a sample. In this case also, the amount of the sample was so large that the DTA curve was over the scale of the recording paper at about 800° C. So, using a reduced amount of $C_{2.35}F(CuF_2)_{0.006}$ (about 3 mg), another DTA curve C' shown in FIG. 2 was obtained. In the case of $C_{2.35}F(CuF_2)_{0.006}$ also, an exothermic peak is observed at about 800° C. The above-mentioned exothermic peaks at about 800° C. are attributed to the pyrolysis of the graphite. With respect to $C_{2.35}F(CuF_2)_{0.006}$, two large exothermic peaks are observed at about 620° C. and about 670° C., respectively. It is believed that these peaks are attributed to the pyrolysis of the graphite fluoride. With respect to the above-mentioned ternary graphite intercalation compounds, there are not observed clear peaks attributed to the pyrolysis of the ternary graphite intercalation compounds.

Figure 3:
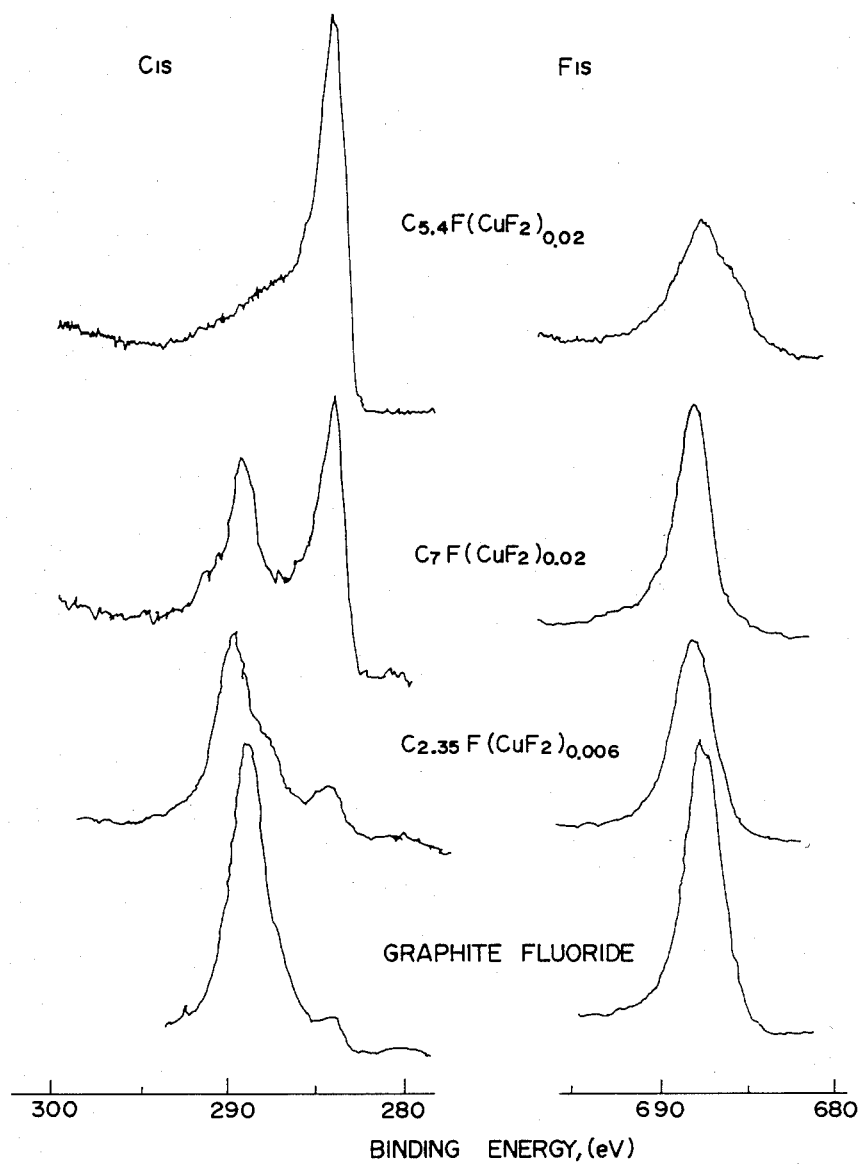
FIG. 3 shows ESCA (electron spectroscopy for chemical analysis) spectra of $C_{5.4}F(CuF_2)_{0.02}$, $C_7F(CuF_2)_{0.02}$ and $C_{2.35}F(CuF_2)_{0.006}$, shown in comparison with those of a graphite fluoride.

ESCA is one of the most useful means to give valuable information concerning a chemical bond between the host graphite and the intercalant. In FIG. 3, there are shown ESCA spectra of $C_{5.4}F(CuF_2)_{0.02}$, $C_7F(CuF_2)_{0.02}$ and $C_{2.35}F(CuF_2)_{0.006}$, shown in comparison with that of a graphite fluoride composed of 59% by weight of $(C_2F)_n$ and 41% by weight of $(CF)_n$. A $(C_2F)_n$ type graphite fluoride has two carbon ls peaks at 289.0 eV and 287.0 eV as compared with contamination carbon ls peak located at 284.0 eV. The $C_{ls}$ peak at 289.0 eV is attributed to C-F bonds and that appearing at 287.0 eV is attributed to C-C bonds adjacent to C-F bonds. Since a $(CF)_n$ type graphite fluoride has only C-F covalent bonds, the ESCA spectrum has only one $C_{ls}$ peak at 289.0 eV. With respect to the $C_{ls}$ spectrum of $C_{5.4}F(CuF_2)_{0.02}$, a large peak at 284.0 eV attributed to C-C covalent bonds and a broad shoulder are observed. The shoulder suggests the presence of carbon atoms weakly interacting with fluorine atoms. In the case of $C_7F(CuF_2)_{0.02}$, a clear peak at 288.7 eV is observed instead of the shoulder observed in the $C_{ls}$ spectrum of $C_{5.4}F(CuF_2)_{0.02}$. In the case of $C_{2.35}F(CuF_2)_{0.006}$, a peak corresponding to the peak at 288.7 eV of $C_{5.4}F(CuF_2)_{0.02}$ is observed and the peak is very high as compared with the peak at 284 eV because a relatively large amount of $(C_2F)_n$ is formed in the vicinity of the surface of the sample. With respect to the $F_{ls}$ spectra, the half value widths of the peaks of $C_7F(CuF_2)_{0.02}$ and $C_{2.35}F(CuF_2)_{0.006}$ are smaller than that of $C_{5.4}F(CuF_2)_{0.02}$.

Figure 5:
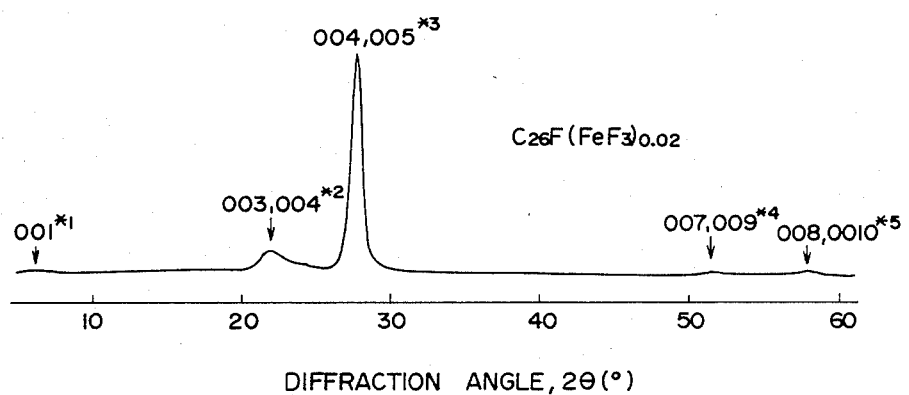
FIG. 5 shows an X-ray diffraction pattern of $C_{26}F(FeF_3)_{0.02}$ which is a still further form of the ternary graphite intercalation compounds according to the present invention.
Figure 6:
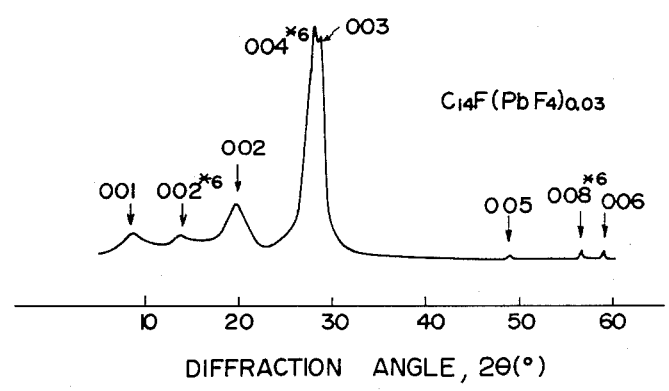
FIG. 6 shows an X-ray diffraction pattern of $C_{14}F(PbF_4)_{0.03}$ which is a still further form of the ternary graphite intercalation compounds according to the present invention.
Figure 7:
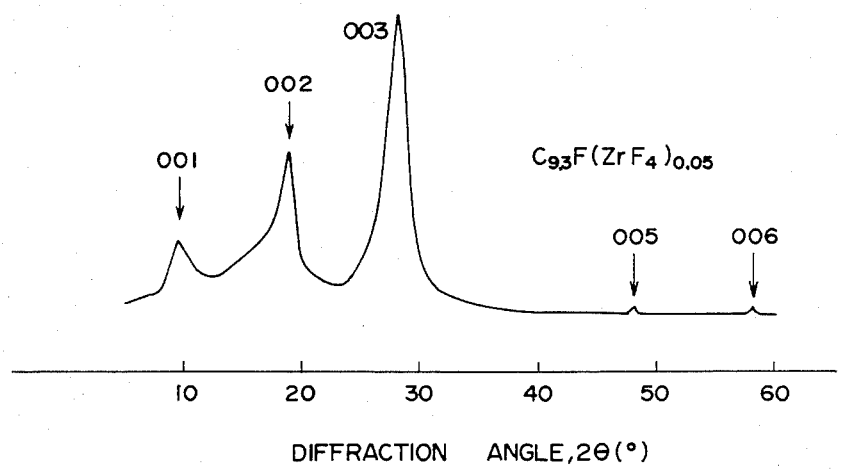
FIG. 7 shows an X-ray diffraction pattern of $C_{9.3}F(ZrF_4)_{0.05}$ which is a still further form of the ternary graphite intercalation compounds according to the present invention.
Figure 8:
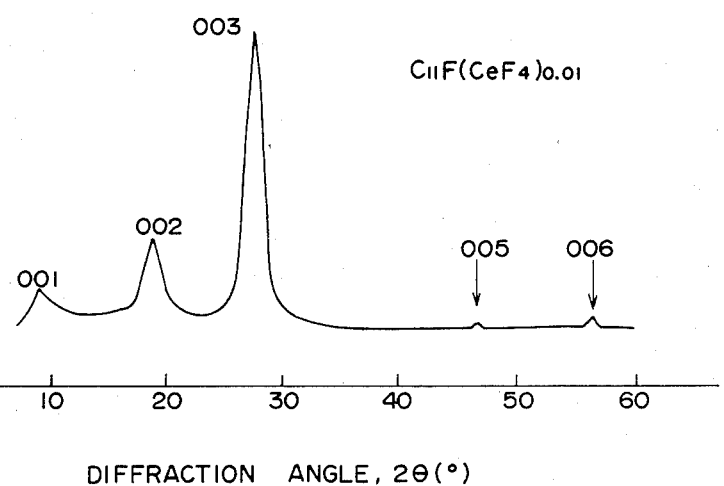
FIG. 8 shows an X-ray diffraction pattern of $C_{11}F(CeF_4)_{0.01}$ which is a still further form of the ternary graphite intercalation compounds according to the present invention.

In FIGS. 4 to 8, there are shown X-ray diffraction patterns (Cu-K$_\alpha$) of $C_{13}F(CoF_3)_{0.05}$, $C_{9.9}F(NiF_2)_{0.03}$, $C_{26}F(FeF_3)_{0.02}$, $C_{14}F(PbF_4)_{0.03}$, $C_{9.3}F(ZrF_4)_{0.05}$ and $C_{11}F(CeF_4)_{0.01}$. $C_{13}F(CoF_3)_{0.05}$, $C_{9.9}F(NiF_2)_{0.03}$, $C_{9.3}F(ZrF_4)_{0.05}$ and $C_{11}F(CeF_4)_{0.01}$ are 1st stage compounds. $C_{26}F(FeF_3)_{0.02}$ is a mixed stage compounds of a 2nd stage compound and a 3rd stage compound. $C_{14}F(PbF_4)_{0.03}$ is a mixed stage compound of a 1st stage compound and a 2nd stage compound. In FIG. 5, *1 means a mixed diffraction line attributed to the 001 diffraction line of a 2nd stage compound and the 001 diffraction line of a 3rd stage compound; *2 means a mixed diffraction line attributed to the 003 diffraction line of a 2nd stage compound and the 004 diffraction line of a 3rd stage compound; *3 means a mixed diffraction line attributed to the 004 diffraction line of a 2nd stage compound and the 005 diffraction line of a 3rd stage compound; *4 means a mixed diffraction line attributed to the 007 diffraction line of a 2nd stage compound and the 009 diffraction line of a 3rd stage compound; and *5 means a mixed diffraction line attributed to the 008 diffraction line of a 2nd stage compound and the 0010 diffraction line of a 3rd stage compound. In FIG. 6, *6 means a diffraction line of a 2nd stage compound and diffraction lines without *6 are diffraction lines of a 1st stage compound.

With respect to the formation of the ternary graphite intercalation compound of the formula $C_xF(MF_z)_y$ (wherein M is a metal), it is believed to be as follows. Gaseous species $(MF_z)_m \cdot (F_2)_n$ (wherein $MF_z$ is a metal fluoride) is first formed by the reaction of $MF_z$ with fluorine according to the following formula:

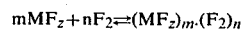
$$mMF_z + nF_2 \rightleftarrows (MF_z)_m \cdot (F_2)_n$$

The gaseous species is then intercalated into graphite. Since these chemical equilibriums move to the left with elevation in temperature, gaseous complexes will be decomposed at high temperatures.

Next, an explanation will be given on the electrical conductivities in the direction of a-axis (parallel to graphite layers) of the graphite intercalation compounds according to the present invention. It is generally known to those skilled in the art that there is substantially no difference in electrical conductivity between a 2nd stage compound and a 3rd stage compound and that the 2nd stage compound and the 3rd stage compound have excellent electrical conductivity as compared with other stage compounds [see D. Billand, A. Herold and F. Vogel, SYNTHETIC METALS, 3

(1981) 279–288]. A-axis conductivities were measured of pyrolytic graphite (manufactured and sold by Nippon Carbon Co. Ltd., Japan) and $C_{14}F(CuF_2)_{0.04}$ (mixed stage compound of 1st stage and 2nd stage) and $C_{9.5}F(FeF_3)_{0.04}$ (1st stage compound) according to the non-contact method as described in Synthetic Metals, 3, 247 (1981).

The results are shown in Table 4.

TABLE 4

| Sample | Conductivity ($\Omega^{-1} \cdot cm^{-1}$) (at 25° C.) |
| --- | --- |
| Pyrolytic graphite | $1.7 \times 10^4$ |
| $C_{14}F(CuF_2)_{0.04}$ | $2.0 \times 10^5$ |
| $C_{9.5}F(FeF_3)_{0.04}$ | $1.5 \times 10^5$ |

As shown in Table 4, the conductivity of each of $C_{14}F(CuF_2)_{0.04}$ and $C_{9.5}F(FeF_3)_{0.04}$ is higher than that of the original pyrolytic graphite by one digit. As is apparent from the above, the ternary graphite intercalation compound according to the present invention has a high electrical conductivity as compared with a graphite material. The ternary graphite intercalation compound according to the present invention can be sheathed by a copper foil or incorporated into an epoxy resin so that it can be used as an electrically conductive material. The ternary graphite interclation compound according to the present invention is useful not only as an electrically conductive material but also as a catalyst for various organic reactions.

The present invention will be illustrated in more detail with reference to the following Examples, which should not be construed to be limiting the scope of the present invention.

EXAMPLE 1

In a reactor made of nickel were charged 0.318 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. After evacuation to vacuum, fluorine gas was introduced into the fluorinating apparatus to 1 atm at a temperature of 16° C. and the reaction system was allowed to stand at that temperature for 60 hours. Then the fluorine gas in the apparatus was replaced by nitrogen gas to obtain a slightly bluish black intercalation compound of the formula $C_9F(CuF_2)_{0.01}$.

EXAMPLE 2

In a reactor made of nickel were charged 0.367 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. After evacuation to vacuum, fluorine gas was introduced into the fluorinating apparatus to 1 atm at a temperature of 20° C., and the reaction system was allowed to stand at that temperature for 61 hours. Then the fluorine gas in the apparatus was replaced by nitrogen gas to obtain a slightly bluish black intercalation compound of the formula $C_{5.4}F(CuF_2)_{0.02}$. The results of elementary analysis and X-ray diffraction of $C_{5.4}F(CuF_2)_{0.02}$ are shown in Table 1 as given above.

EXAMPLE 3

In a reactor made of nickel were charged 0.323 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. Then the reaction system was evacuated to almost vacuum and heated to 49° C. at a temperature elevation rate of 1° to 3° C./min while continuing the evacuating operation. After the temperature of the reaction system became constant at 49° C., the evacuating operation was stopped. Fluorine gas was then introduced into the fluorinating apparatus to 1 atm and the reaction system was allowed to stand at that temperature for two days. Then the fluorinating apparatus was cooled to room temperature and kept at room temperature. The total of the cooling time and the period of time for which the apparatus was kept at room temperature was nine hours. Then the fluorine gas in the apparatus was replaced by nitrogen gas to obtain a slightly bluish black ternary graphite intercalation compound of the formula $C_{13}F(CuF_2)_{0.12}$.

EXAMPLE 4

In a reactor made of nickel were charged 0.300 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. Then the reaction system was evacuated to almost vacuum and heated to 58° C. at a temperature elevation rate of 1° to 3° C./min while continuing the evacuating operation. After the temperature of the reaction system became constant at 58° C., the evacuating operation was stopped. Fluorine gas was then introduced into the fluorinating apparatus to 1 atm and the reaction system was allowed to stand at that temperature for two days. Then the fluorinating apparatus was cooled to room temperature and kept at room temperature. The total of the cooling time and the period of time for which the apparatus was kept at room temperature was ten hours. Then the fluorine gas in the apparatus was replaced by nitrogen gas to obtain a slightly bluish black ternary graphite intercalation compound of the formula $C_8F(CuF_2)_{0.04}$. The results of elementary analysis and X-ray diffraction of $C_8F(CuF_2)_{0.04}$ are shown in Table 1 as given above.

EXAMPLE 5

In a reactor made of nickel were charged 0.309 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. Then the reaction system was evacuated to almost vacuum and heated to 113° C. at a temperature elevation rate of 1° to 3° C./min while continuing the evacuating operation. After the temperature of the reaction system became constant at 113° C., the evacuating operation was stopped. Fluorine gas was then introduced into the fluorinating apparatus to 1 atm and the reaction system was allowed to stand at that temperature for two days. Then the fluorinating apparatus was cooled to room temperature and kept at room temperature. The total of the cooling time and the period of time for which the apparatus was kept at room temperature was seven hours. Then the fluorine gas in the apparatus was replaced by nitrogen gas to obtain a slightly bluish black ternary graphite intercalation compound of the formula $C_{13}F(CuF_2)_{0.07}$. The results of elementary analysis and x-ray diffraction of $C_{13}F(CuF_2)_{0.07}$ are shown in Table 1 as given above.

EXAMPLE 6

In a reactor made of nickel were charged 0.356 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. Then the reaction system was evacuated to almost vacuum and heated to 200° C. at a temperature elevation rate of 1° to 3° C./min while continuing the evacuating operation. After the temperature of the reaction system became constant at 200° C., the evacuating operation was stopped. Fluorine gas was then introduced into the fluorinating apparatus to 1 atm and the reaction system was allowed to stand at that temperature for 51 hours. Then the fluorinating apparatus was cooled to room temperature and kept at room temperature. The total of the cooling time and the period of time for which the apparatus was kept at room temperature was 38 hours. Then the fluorine gas in the apparatus was replaced by nitrogen gas to obtain a slightly bluish black ternary graphite intercalation compound of the formula $C_7F(CuF_2)_{0.02}$. The results of elementary analysis and x-ray diffraction $C_7F(CuF_2)_{0.02}$ are shown in Table 1 as given above.

EXAMPLE 7

In a reactor made of nickel were charged 0.329 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. Then the reaction system was evacuated to almost vacuum and heated to 293° C. at a temperature elevation rate of 1° to 3° C./min while continuing the evacuating operation. After the temperature of the reaction system became constant at 293° C., the evacuating operation was stopped. Fluorine gas was then introduced into the fluorinating apparatus to 1 atm and the reaction system was allowed to stand at that temperature for 49 hours. Then the fluorinating apparatus was cooled to room temperature and kept at room temperature. The total of the cooling time and the period of time for which the apparatus was kept at room temperature was 12 hours. Then the fluorine gas in the apparatus was replaced by nitrogen gas to obtain a slightly bluish black ternary graphite intercalation compound of the formula $C_5F(CuF_2)_{0.04}$.

EXAMPLE 8

In a reactor made of nickel were charged 0.352 g of flaky natural graphite having a size of 20 to 48 mesh (Tyler) from Madagascar ore and 0.5 g of commercially available anhydrous $CuF_2$, with a nickel-made net placed therebetween, and the reactor was then placed in a fluorinating apparatus. Then the reaction system was evacuated to almost vacuum and heated to 343° C. at a temperature elevation rate of 1° to 3° C./min while continuing the evacuating operation. After the temperature of the reaction system became constant at 343° C., the evacuating operation was stopped. Fluorine gas was then introduced into the fluorinating apparatus to 1 atm and the reaction system was allowed to stand at that temperature for two days. Then the fluorinating apparatus was cooled to room temperature and kept at room temperature. The total of the cooling time and the period of time for which the apparatus was kept at room temperature was 24 hours. Then the fluorine gas in the apparatus was replaced by nitrogen gas to obtain a slightly bluish black ternary graphite intercalation compound of the formula $C_{2.4}F(CuF_2)_{0.01}$. The results of elementary analysis and x-ray diffraction of $C_{2.4}F(CuF_2)_{0.01}$ are shown in Table 1 as given above.

EXAMPLE 9

In a reactor made of nickel were charged 2.00 g of flaky natural graphite having a size of 80 mesh or more (Tyler) from Madagascar ore and 0.500 g of commercially available $NiF_2$, with a nickel-made net placed therebetween, and the reactor was then placed in a fluorinating apparatus. After evacuation to vacuum, fluorine gas was introduced into the fluorinating apparatus to 1 atm at a temperature of 150° C., and the reaction system was allowed to stand at that temperature for 48 hours. Then the fluorinating apparatus was cooled to room temperature and kept at room temperature. The total of the cooling time and the period of time for which the apparatus was kept at room temperature was 23 hours. Then the fluorine gas in the apparatus was replaced by nitrogen gas to obtain a black intercalation compound of the formula $C_{9.9}F(NiF_2)_{0.3}$. The results of elementary analysis and X-ray diffraction of $C_{9.9}F(NiF_2)_{0.3}$ are shown in Table 1 as given above.

EXAMPLE 10

In a reactor made of nickel were charged 2.00 g of flaky natural graphite having a size of 80 mesh or more (Tyler) from Madagascar ore and 0.67 g of $CoF_3$ which was prepared by treating commercially available $CoF_2.3H_2O$ in a nitrogen atmosphere at 300° C., with a nickel-made net placed therebetween, and the reactor was then placed in a fluorinating apparatus. After evacuation to vacuum, fluorine gas was introduced into the fluorinating apparatus to 1 atm at a temperature of 150° C., and the reaction system was allowed to stand at that temperature for 48 hours. Then the fluorinating apparatus was cooled to room temperature and kept at room temperature. The total of the cooling time and the period of time for which the apparatus was kept at room temperature was 16 hours. Then the fluorine gas in the apparatus was replaced by nitrogen gas to obtain a black ternary graphite intercalation compound of the formula $C_{13}F(CoF_3)_{0.05}$. The results of elementary analysis and X-ray diffraction of $C_{13}F(CoF_3)_{0.05}$ are shown in Table 1 as given above.

When the commercially available cobalt fluoride ($CoF_2 . 3H_2O$) was treated in a nitrogen atmosphere at 300° C., the color of the cobalt fluoride was changed from pink ($CoF_2$) to light brown ($CoF_3$). Therefore, the cobalt fluoride used in the above reaction was $CoF_3$.

EXAMPLE 11

In two nickel-made containers were respectively charged 0.3008 g of flaky natural graphite having a size of 20 to 48 mesh (Tyler) from Madagascar ore and about 0.2 g of $FeF_3$ which was obtained by purifying commercially available $FeF_3$ in a fluorine atmosphere at 400° C., and the containers were then placed in a fluorinating apparatus. After evacuation to vacuum, fluorine gas was introduced into the fluorinating apparatus to 1 atm at a temperature of about 20° C., and the reaction system was allowed to stand at that temperature for 97 hours. Then the fluorine gas in the apparatus was replaced by nitrogen gas to obtain a black ternary graphite intercalation compound of the formula $C_{26}F(FeF_3)_{0.02}$. The results of elementary analysis and X-ray diffraction of $C_{26}F(FeF_3)_{0.02}$ are shown in Table 3.

EXAMPLE 12

In a reactor made of nickel were charged 2.00 g of flaky natural graphite having a size of 80 mesh or more (Tyler) from Madagascar ore and 0.5 g of commercially available $PbF_2$, with a nickel-made net placed therebetween, and the reactor was then placed in a fluorinating apparatus. After evacuation to vacuum, fluorine gas was introduced into the fluorinating apparatus to 1 atm at a temperature of 140° C., and the reaction system was allowed to stand at that temperature for 51 hours. Then the fluorinating apparatus was cooled to room temperature and kept at room temperature. The total of the cooling time and the period of time for which the apparatus was kept at room temperature was 16 hours. Then the fluorine gas in the apparatus was replaced by nitrogen gas to obtain a black ternary graphite intercalation compound of the formula $C_{14}F(PbF_4)_{0.03}$. The results of elementary analysis and X-ray diffraction of $C_{14}F(PbF_4)_{0.03}$ are shown in Table 2 as given above.

EXAMPLE 13

In a reactor made of nickel were charged 2.00 g of flaky natural graphite having a size of 80 mesh or more (Tyler) from Madagascar ore and 0.5 g of commercially availble $ZrF_4$, with a nickle-made net placed therebetween, and the reactor was then placed in a fluorinating apparatus. After evacuation to vacuum, fluorine gas was introduced into the fluorinating apparatus to 1 atm at a temperature of 145° C., and the reaction system was allowed to stand at that temperature for 48 hours. Then the fluorinating apparatus was cooled to room temperature and kept at room temperature. The total of the cooling time and the period of time for which the apparatus was kept at room temperature was 16 hours. Then the fluorine gas in the apparatus was replaced by nitrogen gas to obtain a black ternary graphite intercalation compound of the formula $C_{9.3}F(ZrF_4)_{0.05}$. The results of elementary analysis and X-ray diffraction of $C_{9.3}F(ZrF_4)_{0.05}$ are shown in Table 1 as given above.

EXAMPLE 14

In a reactor made of nickel were charged 2.00 g of flaky natural graphite having a size of 80 mesh or more (Tyler) from Madagascar ore and 0.500 g of commercially available $CeF_3$, with a nickel-made net placed therebetween, and the reactor was then placed in a fluorinating apparatus. After evacuation to vacuum, both the flaky natural graphite and $CeF_3$ in the fluorinating apparatus were heated at 300° C. for 24 hours. After lowering the temperature to 150° C., fluorine gas was introduced into the fluorinating apparatus to 1 atm, and the reaction system was allowed to stand at a temperature of 150° C. for 117 hours. Then the fluorinating apparatus was cooled to room temperature and kept at room temperature. The total of the cooling time and the period of time for which the apparatus was kept at room temperature was 25 hours. Then the fluorine gas in the apparatus was replaced by nitrogen gas to obtain a black intercalation compound of the formula $C_{11}F(CeF_4)_{0.01}$. The results of elementary analysis and X-ray diffraction of $C_{11}F(CeF_4)_{0.01}$ are shown in Table 1.

EXAMPLE 15

In two nickel-made containers were respectively charged a 5 mm×5 mm×0.5 mm—block of pyrolytic graphite (temperature of heat treatment:3000° C.) (manufactured and sold by Nippon Carbon Co., Ltd. Japan) and 100 mg of $CuF_2$ which was obtained by purifying commercially available anhydrous $CuF_2$, and the containers were then placed in a fluorinating apparatus. After evacuation to vacuum, fluorine gas was introduced into the fluorinating apparatus to 1 atm at room temperature (about 25° C.) and the reaction system was allowed to stand at that temperature for one hour. Then the fluorine gas in the apparatus was replaced by nitrogen gas to obtain an intercalation compound of the formula $C_{14}F(CuF_2)_{0.04}$ (mixed stage compound of 1st stage and 2nd stage). The conductivity of the product was $2.0 \times 10^5 \Omega^{-1}$ cm$^{-1}$, whereas the conductivity of the original pyrolytic graphite was $1.7 \times 10^4 \Omega^{-1}$ cm$^{-1}$.

EXAMPLE 16

In two nickel-made containers were respectively charged 5 mm×5 mm×0.5 mm—block of pyrolytic graphite (temperature of heat treatment: 3000° C.) (manufactured and sold by Nippon Carbon Co., Ltd. Japan) and 100 mg of $FeF_3$ which was obtained by purifying commercially available $FeF_3$, and the containers were then placed in a fluorinating apparatus. After evacuation to vacuum, fluorine gas was introduced into the fluorinating apparatus to 1 atm at room temperature (about 25° C.) and the reaction system was allowed to stant at that temperature for one hour. Then the fluorine gas in the apparatus was replaced by nitrogen gas to obtain a black intercalation compound of the formula $C_{9.5}F(FeF_3)_{0.04}$ (1st stage compound). The conductivity of the product was $1.5 \times 10^5 \, \Omega^{-1}$ cm$^{-1}$, whereas the conductivity of the original pyrolytic graphite was $1.7 \times 10^4 \, \Omega^{-1}$ cm$^{-1}$.

In the meantime, the ESCA studies described herein were conducted using a Du Pont 650B Electron Spectrometer with Mg-K$\alpha$ radiation. The DTA was carried out in air using $\alpha$-$Al_2O_3$ as a reference X-ray diffraction studies were carried out using X-ray diffraction apparatus JDX-8F (an apparatus manufactured and sold by JEOL, Ltd., Japan) with Cu-K$\alpha$ radiation.

It is clearly understood from the above examples that according to the present invention there are provided novel ternary intercalation compounds of the formula $C_xF(MF_z)_y$ (wherein M is a metal) having excellent characteristics and a preparation method thereof. Further features and advantages of the present invention are apparent from many experimental data given in the detailed description given before.

What is claimed is:

1. A ternary intercalation compound of a graphite with a metal fluoride and fluorine represented by the formula

$$C_xF(MF_z)_y$$

wherein M is a metal selected from the group consisting of Pb, transition elements, alkaline earth metals exclusive of Mg and metals in group IIIA of the periodic table exclusive of Al; x is about 1 to about 100; y is about 0.0001 to about 0.15; and z is the valence of M, said metal being one of which the fluoride has a boiling point of about 400° C. or more or one of which the fluoride has a sublimation point of about 400° C. or more.

2. A ternary intercalation compound according to claim 1, wherein said ternary intercalation compound of a graphite with a metal fluoride and fluorine is a mixed stage compound comprising at least two members selected from the group consisting of a 1st stage compound, a 2nd stage compound, a 3rd stage compound, a 4th stage compound, a 5th stage compound, a 6th stage compound, a 7th stage compound and an 8th stage compound.

3. A process for producing a ternary intercalation compound of a graphite with a metal fluoride and fluorine represented by the formula $$C_xF(MF_z)_y$$

wherein M is a metal selected from the group consisting of Pb, transition elements, alkaline earth metals exclusive of Mg and metals in group IIIA of the periodic table exclusive of Al; x is about 1 to about 100; y is about 0.0001 to about 0.15; and z is the valence of M, said metal being one of which the fluoride has a boiling point of about 400° C. or more or one of which the fluoride has a sublimation point of about 400° C. or more, which comprises reacting a graphite material with a metal fluoride having a boiling point of about 400° C. or more or a sublimation point of about 400° C. or more and selected from the group consisting of fluorides of Pb, transition elements, alkaline earth metals exclusive of Mg and metals in group IIIA of the periodic table exclusive of Al in an atmosphere of fluorine gas at a temperature of 0° C. to 400° C. for at least a period of time to effect a weight increase in the graphite.

4. A process according to claim 3, wherein the graphite material and the metal fluoride are employed in a weight ratio of 1:0.01 to 1:100.

5. A process according to claim 3, wherein the temperature is 0° C. to 300° C.

6. A process according to claim 3, wherein the atmosphere of fluorine gas has a fluorine gas pressure of 0.1 to 10 atm.

7. An electrically conductive material comprising a ternary intercalation compound of a graphite with a metal fluoride and fluorine represented by the formula $$C_xF(MF_z)_y$$

wherein M is a metal selected from the group consisting of Pb, transition elements, alkaline earth metals exclusive of Mg and metals in group IIIA of the periodic table exclusive of Al; x is about 1 to about 100; y is about 0.0001 to about 0.15; and z is the valence of M, said metal being one of which the fluoride has a boiling point of about 400° C. or more or one of which the fluoride has a sublimation point of about 400° C. or more.

* * * * *